Sept. 2, 1969 R. E. BROCINER 3,464,634
TREATMENT OF CLAY
Filed Feb. 27, 1968 2 Sheets-Sheet 1

INVENTOR
RONALD E. BROCINER
By Stevens, Davis, Miller & Mosher
ATTORNEYS

United States Patent Office 3,464,634
Patented Sept. 2, 1969

3,464,634
TREATMENT OF CLAY
Ronald Eric Brociner, St. Austell, England, assignor to English Clays Lovering Pochin & Company Limited, St. Austell, Cornwall, England, a British company
Filed Feb. 27, 1968, Ser. No. 708,659
Claims priority, application Great Britain, Feb. 28, 1967, 9,574/67
Int. Cl. B02c *13/00;* B04b *15/00;* C04b *33/04*
U.S. Cl. 241—4                            3 Claims

ABSTRACT OF THE DISCLOSURE

A process for removing montmorillonite from a kaolinitic clay, which process comprises deflocculating an aqueous suspension of a kaolinitic clay containing montmorillonite as impurity, applying shearing forces to the deflocculated suspension of the kaolinitic clay at a solids content in the range of from 40 to 80% by weight, and centrifuging the resulting material, after dilution to a solids content in the range 10 to 20% by weight, to separate a montmorillonite-rich fraction from the kaolinite.

Background of the invention

Figure 1:
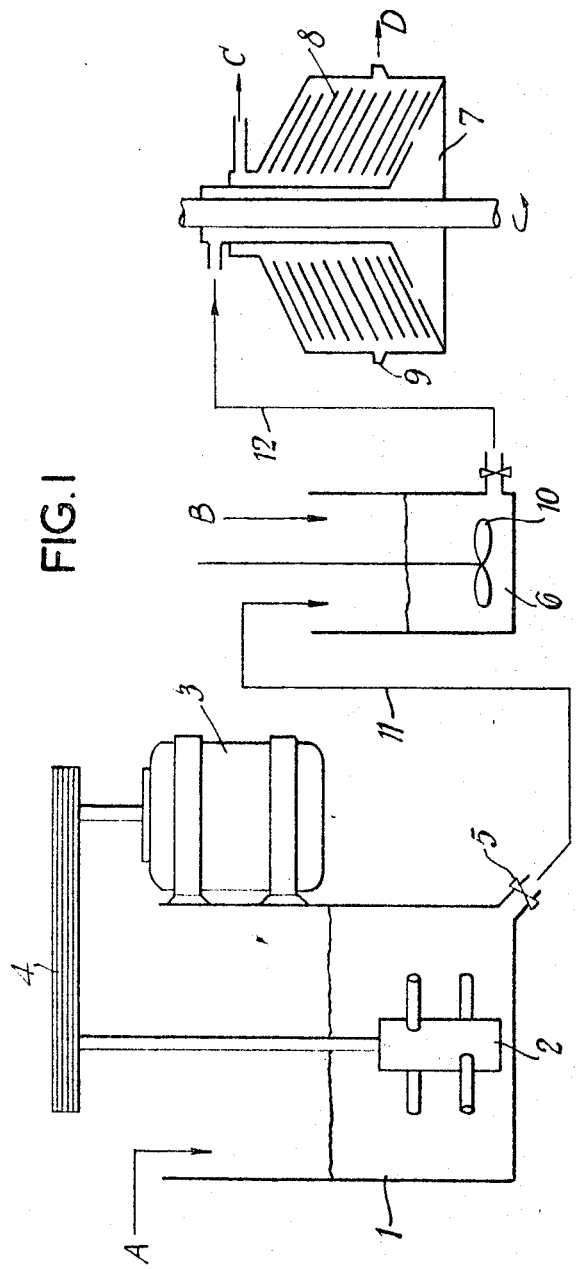

This invention relates to the treatment of clay and, more particularly, is concerned with a method of removing montmorillonite from kaolinitic clay.

Naturally occuring kaolinite is found in admixture with small quanities of montmorillonite. Generally, the quantity of montmorillonite present will not exceed about 4% by weight, but deposits of kaolinitic clays containing up to about 10% by weight of montmorillonite are known. The small size (less than 0.2 micron equivalent spherical diameter) and the high surface area of the particles of montmorillonite in the clay give them a strong tendency to agglomerate to each other and to the particles of kaolinite. For kaolinitic clay which is intended for use in paper coating, the presence of a small percentage of montmorillonite can result in an increase in the viscosity of the kaolin/adhesive mixture (the coating composition); and for this reason it is desirable to remove montmorillonite from kaolinitic clays intended for use in paper coating.

It has been established for many years that fine impurities can be removed from a clay by centrifugally separating a fine fraction from a chemically deflocculated suspension of the clay. However, when applied to a kaolinitic clay containing montmorillonite, it is found that the fine fraction only contains about 20% montmorillonite while a considerable quantity of the mineral still remains in the bulk of the clay.

Summary of the invention

According to the present invention there is provided a process for removing montmorillonite from a kaolinitic clay, which process comprises deflocculating an aqueous suspension of a kaolinitic clay containing montmorillonite as impurity, applying shearing forces to the deflocculated aqueous suspension of the kaolinitic clay at a solids content in the range of from 40 to 80% by weight, and centrifuging the resulting material, after dilution to a solids content in the range 10% to 20% by weight, to separate a montmorillonite-rich fraction from the kaolinite.

We have now discovered that by shearing a deflocculated suspension of a kaolinitic clay, montmorillonite particles can be separated from each other and from the kaolinite particles. If the sheared suspension is then diluted to a solids content in the range 10% to 20% by weight and centrifuged a high yield of nearly pure montmorillonite can be separated in the supernatant suspension.

Description of the preferred embodiments

The solids content at which the deflocculated aqueous suspension of a kaolinitic clay is subjected to the shearing forces is found to be dependent upon inter alia the amount of montmorillonite present in the kaolinitic clay being treated. The larger the amount of montmorillonite present in the kaolinitic clay the lower the limits of the range of solids content which can be employed. For example, in the case of a kaolinitic clay containing up to about 10% by weight of montmorillonite it is found to be impracticable to separate at solids contents higher than 70% by weight and lower than 40% by weight. On the other hand, in the case of a kaolinitic clay containing up to about 4% by weight of montmorillonite, it is found to be impracticable to operate at solids contents higher than 80% by weight and lower than 55% by weight.

For substantially complete extraction of the montmorillonite the work done on the aqueous clay suspension generally needs to be of the order of 100 horsepower hours per ton of clay. The work done on the clay can be reduced at the cost of a reduction in the amount of montmorillonite extracted. Preferably, the amount of work done on the aqueous clay suspension is at least 60 horsepower hours per ton of clay.

For a better understanding of the invention and to show how the same may be carried into effect, reference will now be made, by way of example to FIGURE 1 of the accompanying drawings which shows schematically a plant suitable for carrying out the process of the invention.

Referring to FIGURE 1 of the accompanying drawing, a deflocculated, aqueous suspension of a kaolinitic clay A, which may be, for example, china clay or ball clay, having a solids content in the range of from 40 to 80% by weight is introduced into a mixer 1 where it is subjected to high intensity shearing forces. The mixer 1 includes an impeller 2 which is of the bar-turbine type and is driven by an electric motor 3 via a belt drive 4. After the required amount of work has been done on the clay suspension, a valve 5 is opened and the dispersed suspension is run through a conduit 11 into a tank 6 provided with a stirrer 10. Sufficient water B is added to the suspension in tank 6 to reduce the solids content thereof to a value in the range 10 to 20% by weight. The diluted suspension is then fed through a conduit 12 to a centrifuge 7 which separates a fine montmorillonite-rich fraction from the larger kaolinite particles. The centrifuge 7 is a continuous centrifuge containing frusto-conical discs 8, which increase the surface area available for separation, and provided with nozzles 9, through which the coarse fraction comprising substantially pure kaolinite D is ejected. The montmorillonite-rich fraction is ejected at C. Centrifuges of this type are manufactured by the Alfa Laval Company.

The bar turbine mixer 1 can be replaced by, for example, a colloid mill, a mill of the slotted rotor and stator type, e.g. the Kady mill, a serrated disc turbine mill or a kneader, e.g. of the "sigma" blade type. The separation of the fine montmorillonite-rich fraction from the larger kaolinite particles can be performed in a batch process by means of, for example, a solid bowl centrifuge provided with means for skimming off the supernatant layer containing the bulk of the montmorillonite. It should be noted that it is not practicable to perform the separation by gravitational sedimentation processes as the length of time necessary for a substantially complete separation of the montmorillonite particles from the finest kaolinite particles would be prohibitive.

The invention is further illustrated by the following example.

Example

Samples of a suspension of a kaolinitic clay at a solids content of 70% by weight and deflocculated with 0.3% by weight, based on the weight of the clay, of tetrasodium pyrophosphate, were each subjected to shearing forces using a bar turbine mixer. The kaolinitic clay contained before treatment 3.6% by weight of montmorillonite and comprised 80% by weight of particles finer than 2 microns. A different work input for each sample was selected.

At the end of the period of mixing in the bar turbine mixer each suspension was immediately diluted to 15% by weight solids content and centrifuged in a 20 inch diameter solid bowl centrifuge running at 2000 r.p.m. After 30 minutes in the centrifuge the bulk of the clay had formed a firm deposit on the wall of the bowl while very fine particles remained in suspension in the supernatant water layer. The water layer containing the very fine particles was removed by a skimmer pipe. The surface of the clay deposit was washed with clean water and the centrifuge was run for a further period of 30 minutes. The supernatant layer was again skimmed out of the centrifuge bowl.

Figure 2:
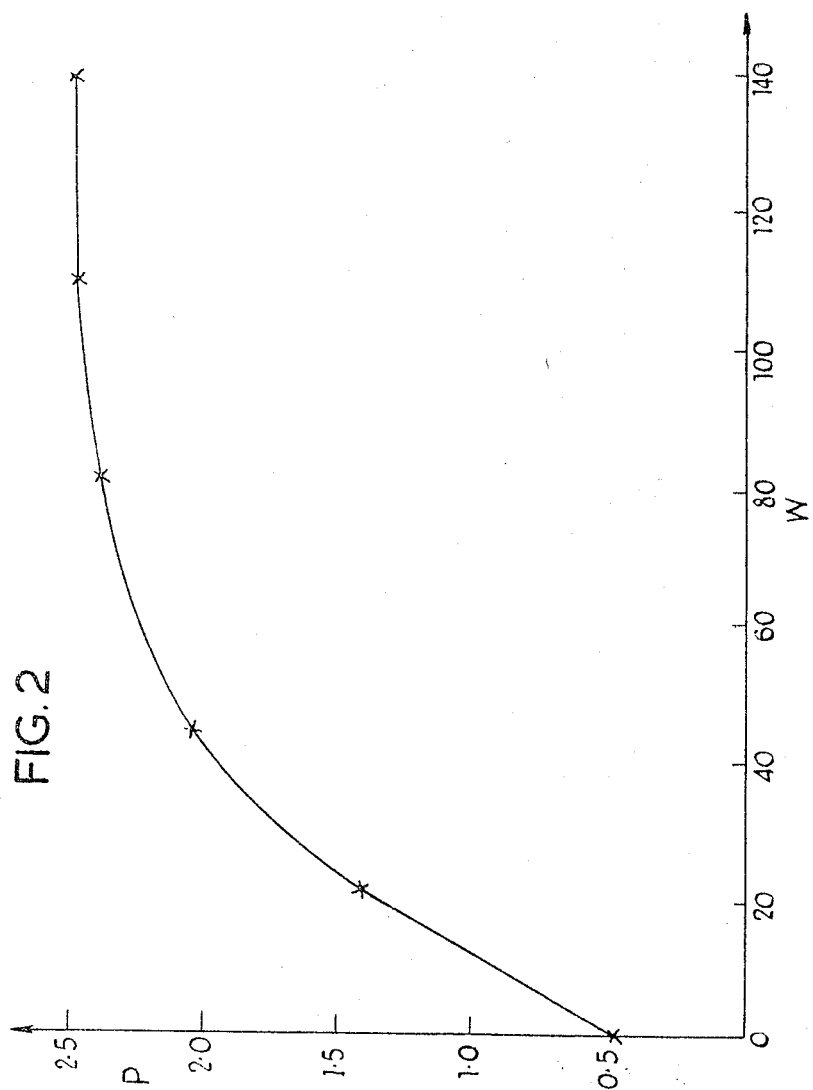

Analysis of the fine fractions by X-ray diffraction and methylene blue adsorption showed that they consisted of about 95% by weight montmorillonite. Analysis of each of the clay suspensions treated by the process showed how much montmorillonite had been extracted. FIGURE 2 of the accompanying drawings shows the percentage P of montmorillonite extracted, based on the total amount of clay treated, as a function of the work W done on the kaolinitic clay in horsepower hours per ton of clay. It can be seen that, having regard to the total 3.6% by weight of montmorillonite present in the clay, about 2.4% by weight could be removed when using the process of the present invention whereas only about 0.5% by weight could be removed by simple centrifuging.

The improvement which can be obtained in the viscosity of a paper coating composition when there is employed a kaolinitic clay which has been treated by means of the process of the present invention to remove montmorillonite therefrom is shown by the following test:

Three samples of paper coating compositions were prepared. The first sample was prepared using as pigment a coating clay which had been treated in the manner described in the foregoing example so as to remove most of the montmorillonite therefrom; the second sample was prepared using as pigment a clay from which no montmorillonite had been removed; and the third sample was prepared using as pigment a clay which had been centrifuged only. In each sample of paper coating composition, the adhesive used consisted of 10 parts by weight of Viscosol 310 starch and 4 parts by weight of Dow 636 latex emulsion for each 100 parts by weight of clay pigment. The total solids content of each of the paper coating compositions was 60%. The viscosities of the three coating compositions, measured on a Brookfield viscometer at 50° C. and 100 r.p.m. were:

|  | Cp. |
|---|---|
| First sample | 1,100 |
| Second sample | 7,500 |
| Third sample | 4,400 |

I claim:

1. A process for removing montmorillonite from a kaolinitic clay, which process comprises deflocculating an aqueous suspension of a kaolinitic clay containing montmorillonite as impurity, applying shearing forces to the deflocculated suspension of the kaolinitic clay at a solids content in the range of from 40 to 80% by weight, the shearing forces applied to the clay being such that the work done on the clay is at least 60 horsepower hours per ton of clay, and centrifuging the resulting suspension, after dilution to a solids content in the range 10 to 20% by weight, to separate a montmorillonite-rich fraction from the kaolinite.

2. A process according to claim 1, wherein the kaolinitic clay contains up to 4% by weight of montmorillonite and wherein the deflocculated aqueous suspension of the kaolinitic clay is subjected to the shearing forces at a solids content in the range of from 55 to 80% by weight.

3. A process according to claim 1, wherein the kaolinitic clay contains up to 10% by weight of montmorillonite and wherein the deflocculated aqueous suspension of the kaolinitic clay is subjected to the shearing forces at a solids content in the range of from 40 to 70% by weight.

References Cited

UNITED STATES PATENTS

| 2,158,987 | 5/1939 | Maloney | 23—110 X |
| 2,904,267 | 9/1959 | Lyons. | |
| 3,414,422 | 12/1968 | Iannicelli | 106—72 X |
| 3,097,801 | 7/1963 | Duke | 241—16 |
| 3,253,791 | 5/1966 | Cohn | 241—16 X |

FOREIGN PATENTS 734,045　7/1932　France.

HARRY B. THORNTON, Primary Examiner

ROBERT HALPER, Assistant Examiner

U.S. Cl. X.R.

23—110; 106—72, 288; 209—5; 241—16, 24